United States Patent Office 2,842,194
Patented July 8, 1958

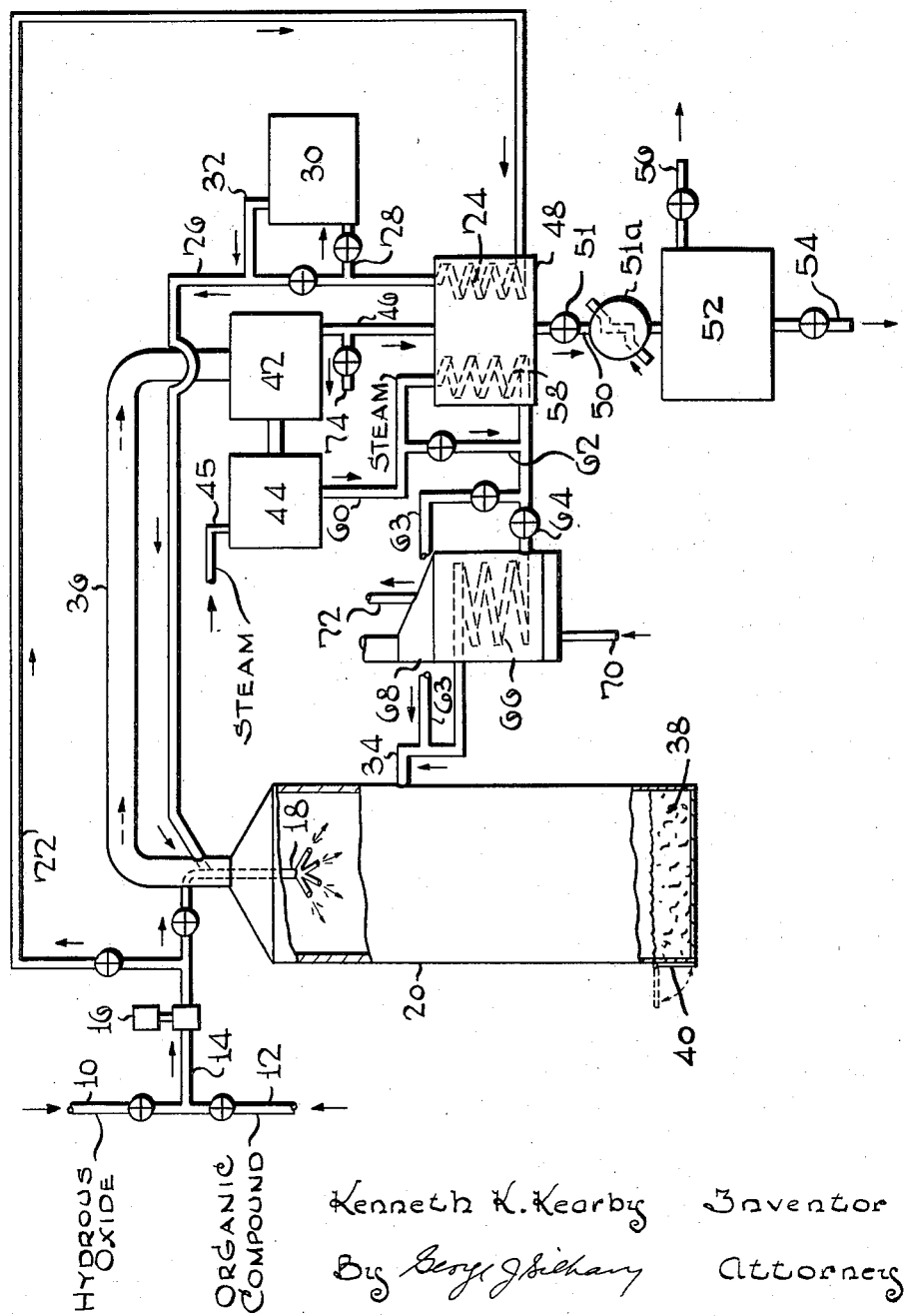

2,842,194
APPARATUS FOR MANUFACTURE OF CATALYSTS

Kenneth K. Kearby, Cranford, N. J., assignor to Esso Research and Engineering Company, a corporation of Delaware Application December 11, 1952, Serial No. 325,372

2 Claims. (Cl. 159—4)

This invention relates to the manufacture of catalysts and more particularly relates to drying catalytic materials or hydrous oxides to facilitate recovery of valuable solvents.

Good cracking catalysts have been prepared by mixing hydrous silica with aluminum alcoholate solutions and drying, but this method results in a loss of the alcohol produced on hydrolysis. Greater alcohol recovery is obtained when the hydrous silica is mixed with alumina sol which has been separated from the alcohol but this method gives a less satisfactory catalyst.

According to the present invention, improved catalysts can be obtained by directly mixing a hydrous oxide with a compound comprising a metal and an organic compound, spray drying the resulting mixture into an atmosphere of superheated steam and condensing the volatile products and recovering the organic compound. More specifically, a hydrous oxide such as silica hydrogel or silica sol is mixed with aluminum alcoholate to hydrolyze the alcoholate and produce or regenerate alcohol which is recovered in the steam spray drying step.

According to the present invention in order to reduce drying costs a vapor recompression system may be used for lowering heat requirements of the process and for recovering organic compounds such as alcohols and solvents. The overhead vapors from the spray drying step may be compressed by means of a steam turbine or the like and used to heat expanded steam from the turbine or other source which is then further heated if necessary and injected into the spray dryer. The recompression step increases the recovery of the alcohol or other organic compound from the vapors.

In the drawing, the figure represents one form of apparatus adapted for practicing the invention.

Referring now to the drawing the reference character 10 designates a line for conducting a hydrous oxide to be mixed with a metallic organic compound in a solvent passing through line 12. The resulting mixture is passed through line 14 by high pressure pump 16 which forces the mixture through spray means 18 at the top of spray dryer 20. While the present invention is useful in a multiplicity of reactions where it is desired to recover the organic compound or compounds, the invention will be specifically described for the manufacture of silica-alumina catalysts using a hydrous oxide such as silica sol or silica hydrogel and aluminum amylate. The amylate is preferred because on condensing the volatile products passing overhead from the spray dryer, a liquid-liquid separation can be made for easier recovery of the substantially water insoluble amyl alcohol. To make anhydrous amyl alcohol to be used again for reaction with additional aluminum to produce more aluminum amylate, it is only necessary to heat or distil the recovered amyl alcohol to remove dissolved or entrained water. Amyl alcohol which is dissolved in the water layer may be recovered by distillation or extraction.

Upon mixing the silica sol and aluminum alcoholate, the alcoholate is hydrolyzed by the water in the silica sol to regenerate the amyl alcohol and form a slurry of alumina in water. The mixture comprising silica, alumina, water and alcohol may be preheated to a temperature of about 150° to 210° F. before it is sent to the spray dryer 20. The mixture passing through line 14 may also be aged to improve the final silica-alumina catalyst. The amounts of the silica sol and aluminum alcoholate admixed may be varied to obtain any desired amount of alumina in the final silica-alumina catalyst product.

The mixture of silica sol and the alcoholate may be heated in any suitable manner. One way of preheating the mixture is shown in the drawing and includes passing the mixture through line 22 and heat exchanger 24 which receives heat from the recompressed vapors as will be described hereinafter in greater detail. The preheated mixture can then be returned to spray means 18 through line 26. If it is desired to age the mixture before spray drying it, the mixture may be sent to a tank maintained under desired aging conditions where it is preferably maintained in stirred or agitated condition. For a silica-alumina mixture, the aging may be at a temperature of about 80° to 200° F. for 10 minutes to 5 hours or more depending on the temperature selected, longer times being used for lower temperatures and at a pH of between about 2 and 7.

The preheated mixture leaving heat exchanger 24 may be given an aging treatment according to one method as shown in the drawing where the effluent mixture from heat exchanger 24 is passed through line 28 to aging tank 30 and after aging is passed through line 32 and line 26 to spray means 18.

The spray means 18 is any suitable device for subdividing the preheated mixture into small droplets or microspheres which are introduced into the top of the spray dryer 20. The small droplets have a size such that the dried microspheres will be largely in the range from about 20 to 100 microns. Superheated steam at a temperature of about 300° to 600° F. is introduced by line 34 into an intermediate portion of the spray dryer but below the spray means 18. The steam flows upwardly counter-current to the downflowing droplets to remove water and alcohol therefrom as vapors which pass overhead through line 36 at a temperature of about 200° to 300° F. and are further treated as will be presently described. By using superheated steam rather than flue gas the loss of alcohol by the carrying effect of the flue gas is prevented and better alcohol recovery is obtained.

The silica alumina particles containing about 5 to 30% water are collected at the bottom of spray dryer 20 as shown at 38 and are removed through door 40 or in any suitable manner. The silica alumina particles may be heated at about 300° to 600° F. to further dry the particles and the dried silica-alumina particles are preferably activated at a temperature of about 600° to 1000° F. for about 1 to 3 hours.

Returning to the overhead vapors leaving the top of spray dryer 20 through line 36, the vapors at a temperature of about 200° to 300° F. are preferably passed to a recompression stage 42 wherein the vapors are raised to a pressure of about 100 to 600 pounds per square inch gauge (p. s. i. g.), and a temperature of about 330° to 500° F. As shown diagrammatically in the drawing the recompression stage 42 comprises a typical centrifugal compressor run by a steam turbine 44. High pressure steam from line 45 is used to operate turbine 44. The steam may be at a temperature of about 300° to 600° F. and about 100 to 1000 lbs. per sq. in. gauge.

The heated recompressed vapors leave compressor 42 through line 46 and pass through indirect heat exchanger 48 where they are cooled to a temperature of about 300° to 150° F. while at a pressure of about 1 to 100 p. s. i. g. and condensed. When heat exchanger 24 is used for preheating the mixture to be spray dried, the preheating is obtained from the compressed vapors passing through heat exchanger 48. The condensate leaves heat exchanger by line 50 and passes through a pressure release valve 51 and an additional cooler 51a to a separator 52 where water forms as a lower layer which is withdrawn through line 54. Low temperatures of 80° to 100° F. give more complete separations, but the use of a hydrocarbon with the alcohol permits the use of somewhat higher separation temperatures. A hydrocarbon distillate boiling in the range of about 200° F. to 500° F. may be used together with the alcohol as a solvent for the alcoholate. The water insoluble alcohol separates as an upper layer in separator 52 and is withdrawn through line 56. When a water soluble alcohol is used, only drawoff line 54 is used. The water insoluble alcohol withdrawn through line 56 contains some dissolved water and it is only necessary to distill off a small quantity to drive off the water to form anhydrous alcohol which is useful for reaction with additional amounts of aluminum metal to produce aluminum alcoholate.

In order to reduce drying costs a vapor recompression system is more adaptable to spray drying than are multiple effect spray dryers. This makes possible the use of one spray dryer operating at essentially atmospheric pressure. The removal of dry solids is thus much simpler than from dryers under pressure or vacuum. The recompression step also increases the recovery of alcohol from the vapors.

The heated compressed vapors in passing through heat exchanger 48 are also preferably used to heat expanded steam from line 60 leaving turbine 44. The expanded steam from line 60 at a temperature of about 200° to 300° F. and about 0 to 75 p. s. i. g. is all or in part passed through heat exchanger coil or the like 58 in heat exchanger 48 where it is reheated to about 300° to 450° F. If desired, part of the expanded steam may be by-passed around heat exchanger 48 through line 62.

If the steam has sufficient superheat after passing through heat exchanger 58, it is passed through line 63 to line 34 and used as superheated steam for spray dryer 20. The pressure in the spray dryer is normally reduced to 0–10 p. s. i. g.

If the preheated steam is insufficiently superheated it may then be passed through line 64 and through heating coil 66 in furnace 68 having inlet 70 for fuel and air and an outlet 72 for flue gas. In furnace 68 the steam is superheated to the temperature above given to which the steam in line 34 is superheated. The superheated steam is then introduced into spray tower 20 through line 34 as above described.

Instead of passing the recompressed vapors through heat exchanger 48, they may by-pass the exchanger 48 and be withdrawn through line 74 and condensed without recovering their sensible heat. It is also possible to recycle some of the recompressed vapors directly from line 46 to line 64 or 34.

The present process is suitable for making silica-alumina compositions of any proportions and broadly is suitable for making any other hydrous oxide products made from organic compounds which must be recovered. Instead of using alcoholates, phenolates, cresylates, or mercaptates of aluminum may also be used. To make other compositions the phenolates or cresylates of magnesium, zinc, calcium, beryllium, chromium, molybdenum, etc. or alloys thereof may be used alone or in combination with other hydrous oxides.

When using soluble alcohols such as isopropyl alcohol to produce the aluminum alcoholate, the alcohol can be recovered from the water solution by distillation or may be extracted with gasoline as a means of adding such alcohol to gasoline. Alcoholates of the other water soluble alcohols may also be used for making the alcoholates of aluminum.

In a broader application the process of the present invention can be operated with no recovery of heat from the vapors passing overhead in line 36 or with a simple heat exchanger for recovering some of the sensible heat but very little of the latent heat of the vapors. With no heat recovery one would merely use superheated steam in the spray dryer tower 20 and vapors passing overhead through line 36 would be condensed with cooling water for recovery (by separation) of the alcohol. Alternatively, the vapors could serve as feed to a still, the cooling being done in a partial condenser at the top of the still and in a product condenser. In this case the alcohols would be taken off overhead from the still.

What is claimed is:

1. An apparatus for drying hydrous oxides and recovering organic liquid from a slurry which includes a spray dryer, means for spraying a slurry containing hydrous oxide and organic liquid into the upper portion of said spray dryer, means for introducing superheated steam into an intermediate portion of said spray dryer for vaporizing the organic liquid, a bottom outlet for dried solids, a top outlet for removing vaporized organic liquid and steam from said spray dryer, a compressor communicating with said top outlet for compressing and heating vapors removed from said spray dryer, a steam turbine for operating said compressor, a heat exchanger, a pipe for leading hot compressed vapors from said compressor to said heat exchanger, a second pipe for removing cooled and condensed vapors from said heat exchanger, a receiver communicating with said second pipe for receiving condensed vapors, means for conducting steam leaving said turbine through said heat exchanger for supplying heat to said steam by indirect contact with said hot compressed vapors and a third pipe for leading said heated steam from said heat exchanger to said means for introducing superheated steam to said spray dryer.

2. An apparatus according to claim 1 wherein furnace means are provided in said third pipe for supplying additional heat to at least part of said heated steam withdrawn from said heat exchanger for passage into spray dryer.

References Cited in the file of this patent

UNITED STATES PATENTS

| 1,213,596 | De Baufre | Jan. 23, 1917 |
| 1,277,895 | Foster | Sept. 3, 1918 |
| 2,254,867 | Bonotto | Sept. 2, 1941 |
| 2,316,670 | Colgate et al. | Apr. 13, 1943 |
| 2,368,049 | Statford | Jan. 23, 1945 |
| 2,428,813 | Rhodes et al. | Oct. 14, 1947 |
| 2,474,910 | Pierce et al. | July 5, 1949 |
| 2,475,984 | Owen | July 12, 1949 |
| 2,503,913 | Kimberlin et al. | Apr. 11, 1950 |
| 2,515,013 | Kruhmin | July 11, 1950 |
| 2,582,099 | Braithwaite | Jan. 8, 1952 |
| 2,636,555 | Klejekto et al. | Apr. 28, 1953 |
| 2,660,236 | Farnsworth | Nov. 24, 1953 |
| 2,746,934 | Richardson et al. | May 22, 1956 |

FOREIGN PATENTS

| 597,136 | Great Britain | Jan. 19, 1948 |